United States Patent [19]

Enein et al.

[11] Patent Number: 4,794,543

[45] Date of Patent: Dec. 27, 1988

[54] MULTI LEVEL SPLIT GATE SIGNAL PROCESSOR DETERMINING THE CENTROID OF A SIGNAL

[75] Inventors: Mohammed Enein, Northport; Everett P. Strickland, Huntington Station, both of N.Y.

[73] Assignee: Hazeltine Corporation, Greenlawn, N.Y.

[21] Appl. No.: 62,377

[22] Filed: Jun. 15, 1987

Related U.S. Application Data

[63] Continuation of Ser. No. 685,830, Dec. 24, 1984, abandoned.

[51] Int. Cl.[4] .................. G06F 15/20; G01S 13/18
[52] U.S. Cl. ............................... 364/486; 342/94; 342/408; 364/715.01; 375/95
[58] Field of Search .............. 364/486, 715, 830; 342/90, 94, 95, 408; 375/94, 95; 455/239, 245

[56] References Cited

U.S. PATENT DOCUMENTS

| | | | |
|---|---|---|---|
| 3,803,394 | 4/1974 | Fraser | 364/830 |
| 3,906,377 | 9/1975 | Harris | 375/95 X |
| 4,062,012 | 12/1977 | Colbert et al. | 342/90 |
| 4,489,326 | 12/1984 | Studenny | 342/408 X |
| 4,499,586 | 2/1985 | Cafarella et al. | 455/239 X |
| 4,587,523 | 5/1986 | Shupe | 342/95 |
| 4,628,469 | 12/1986 | White | 364/830 |

Primary Examiner—Felix D. Gruber
Attorney, Agent, or Firm—E. A. Onders

[57] ABSTRACT

Successive MLS scanning signals are received as pulse-type analog signals and converted into corresponding digital signals. The centroid of each digital signal is determined at at least two different levels below the peak of the digital signal. The centroids for each signal are averaged, whereby the average represents the centroid of the corresponding received pulse-type signal.

3 Claims, 4 Drawing Sheets

MULTI LEVEL SPLIT GATE SIGNAL PROCESSOR DETERMINING THE CENTROID OF A SIGNAL

This application is a continuation of application Ser. No. 685,830, filed 12/24/84, now abandoned.

BACKGROUND OF THE INVENTION

1. Field of the Invention

The invention generally relates to receivers for receiving scanning signals and, in particular, to an apparatus which receives signals having a predetermined time varying format such as a microwave landing system (MLS) receiver for receiving scanning signals provided by an MLS ground system.

2. Description of the Prior Art

The International Civil Aviation Organization (ICAO) has adopted a time reference scanning beam (TRSB) technique as the standard for civil microwave landing systems. MLS ground systems provide elevation (EL) and azimuth (AZ) scanning beams, each including a TO scan followed by a FRO scan, defining the area of coverage of the ground system. An MLS receiver located in an aircraft receives the EL scan and AZ scan and is able to determine the angular displacement of the MLS receiver in the aircraft with respect to the ground system. To do this, it is necessary to establish the centroids of the spatially received signals which result from the swept EL and AZ scanning beams because the azimuth and elevation angles are a function of the time difference between the TO and FRO scans of each beam.

SUMMARY OF THE INVENTION

It is an object of this invention to provide a receiver with a signal processor for determining the centroids of received signals which result from spatially swept scanning beams.

The apparatus according to the invention is for determining the centroid of a received pulse-type signal. The apparatus includes means for detecting the received signal. Means for converting the detected signal into a corresponding digital signal are provided. First threshold detection means are provided for determining the centroid of the digital signal with reference to a first predefined amplitude level below the peak level of the digital signal. Second threshold detection means are provided for determining the centroid of the digital signal with reference to a second predefined amplitude level below the peak of the digital signal. Means are provided for averaging the centroids determined by the first and second threshold means. The average of the centroids represents the time at which the centroid of the received signal occurs.

For a better understanding of the present invention, together with other and further objects, reference is made to the following description, taken in conjunction with the accompanying drawings, and its scope will be pointed out in the appended claims.

DETAILED DESCRIPTION OF THE INVENTION

Figure 1:
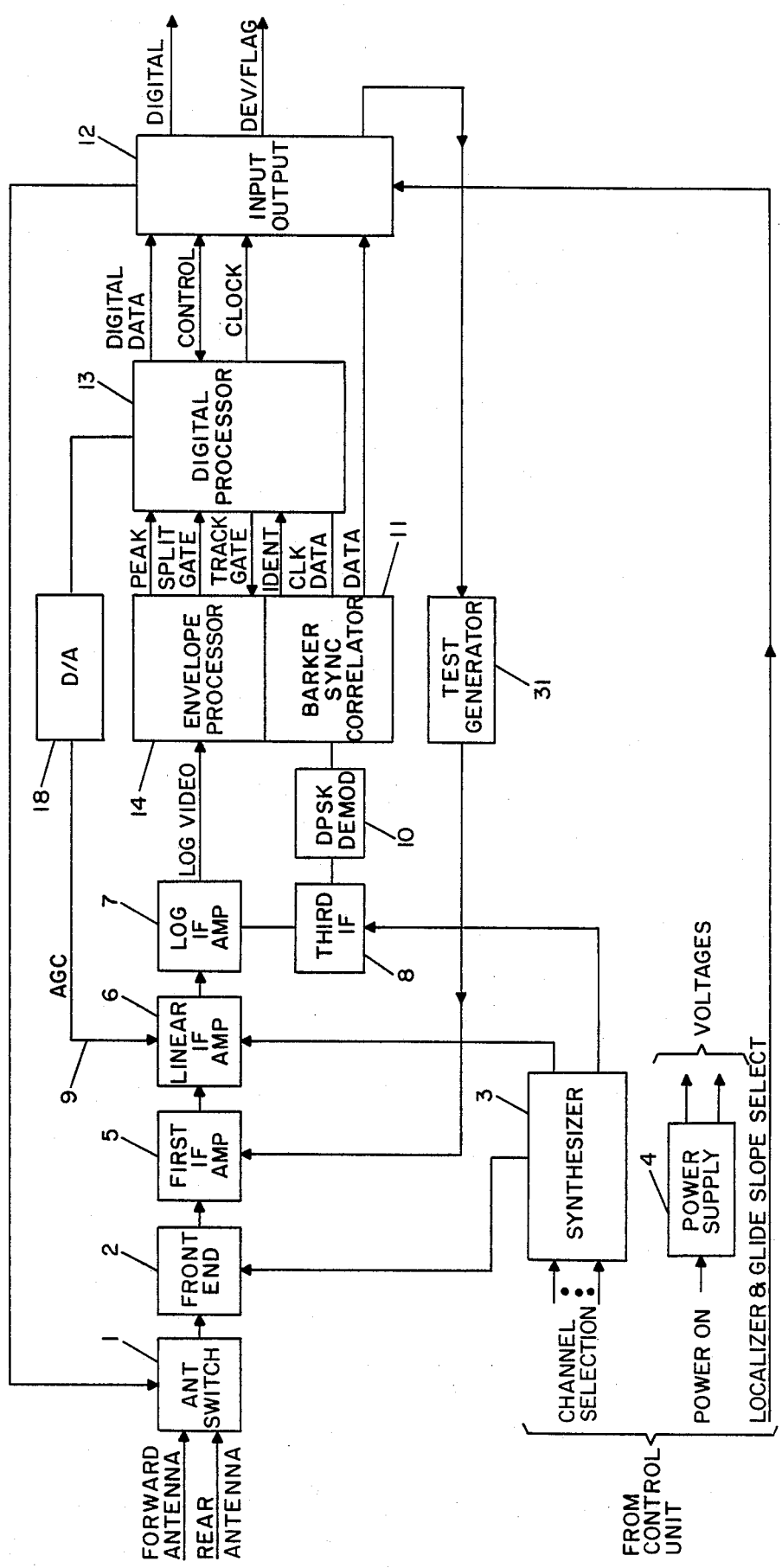
FIG. 1 is a block diagram of an MLS receiver.

As illustrated in FIG. 1, the MLS receiver is provided with an antenna switch 1 which connects either the forward antenna or the rear antenna to front end 2. A control unit (not shown) provides channel selection information to frequency synthesizer 3 which, in turn, provides the appropriate reference frequency to front end 2 for down conversion of the received radio frequency (RF) signal to an intermediate frequency (IF). The control unit also provides power "on" information to power supply 4 which supplies voltages to the various components of the receiver.

MLS receivers require an IF amplifier having a dynamic range which exceeds 80 dB. In order to achieve such a dynamic range, the receiver according to FIG. 1 includes an IF amplifier chain including a first IF amplifier 5 followed by a second IF amplifier consisting of linear IF amplifier 6 and logarithmic IF amplifier 7. The chain is followed by a third IF amplifier 8. Linear IF amplifier 6 and third IF amplifier 8 are provided with local oscillator (LO) frequencies by synthesizer 3 depending on the channel selection. This chain of amplifiers is designed with a linear-logarithmic response so that the logarithmic IF amplifier properties may be used without the difficulties attendant with an amplifier having a particular characteristic over the entire range.

For small signals, linear amplifiers 5 and 6 provide sufficient gain for the logarithmic IF amplifier 7 to operate within its range. As the signal level increases beyond an established level on an overall response curve of logarithmic IF amplifier 7, an AGC (automatic gain control) voltage is applied to linear IF amplifier 6 via line 9 to decrease the totl gain of the linear amplifier so that logarithmic IF amplifier 7 is operating within its range. When the signal level provided by linear IF amplifier 6 decreases below an established level on the overall response curve of logarithmic IF amplifier 7, the AGC voltage remains constant and the gain of linear IF amplifier 6 is at a maximum. The result is that the first and linear IF amplifiers 5 and 6, respectively, maintain operation within the logarithmic response of the receiver characteristic as defined by logarithmic IF amplifier 7.

According to the ICAO standard, the scanning signals detected by the receiver are encoded with differential phase shift keying (DPSK) data. The output of third IF amplifier 8 is provided to DPSK demodulator 10 which is followed by Barker synchronization correlator 11 for decoding the data provided to input/output 12. Localizer and glide slope select information from the control unit (not shown) along with the decoded data are provided to the input/output 12 which controls antenna switch 1 and the deviation or "flag" indicators of the receiver. Input/output 12 also provides digital information to the control unit and provides control information to digital processor 13.

After amplification by amplifiers 5 and 6, the video information is provided to logarithmic IF amplifier 7. Logarithmic video information provided by logarithmic IF amplifier 7 is provided to envelope processor 14. Since the receiver operates in a time division multiplexed mode in which the relative amplitudes of successive azimuth and elevation signals of interest may vary greatly but are predictable based on previously received signals, the previously received amplitude levels of the azimuth and elevation signals are stored for use in controlling the gain of linear IF amplifier 6. This allows the appropriate AGC voltage to be applied via line 9 prior to the anticipated detection of each angle function. Digital microprocessor 13 accomplishes this control.

Figure 2:
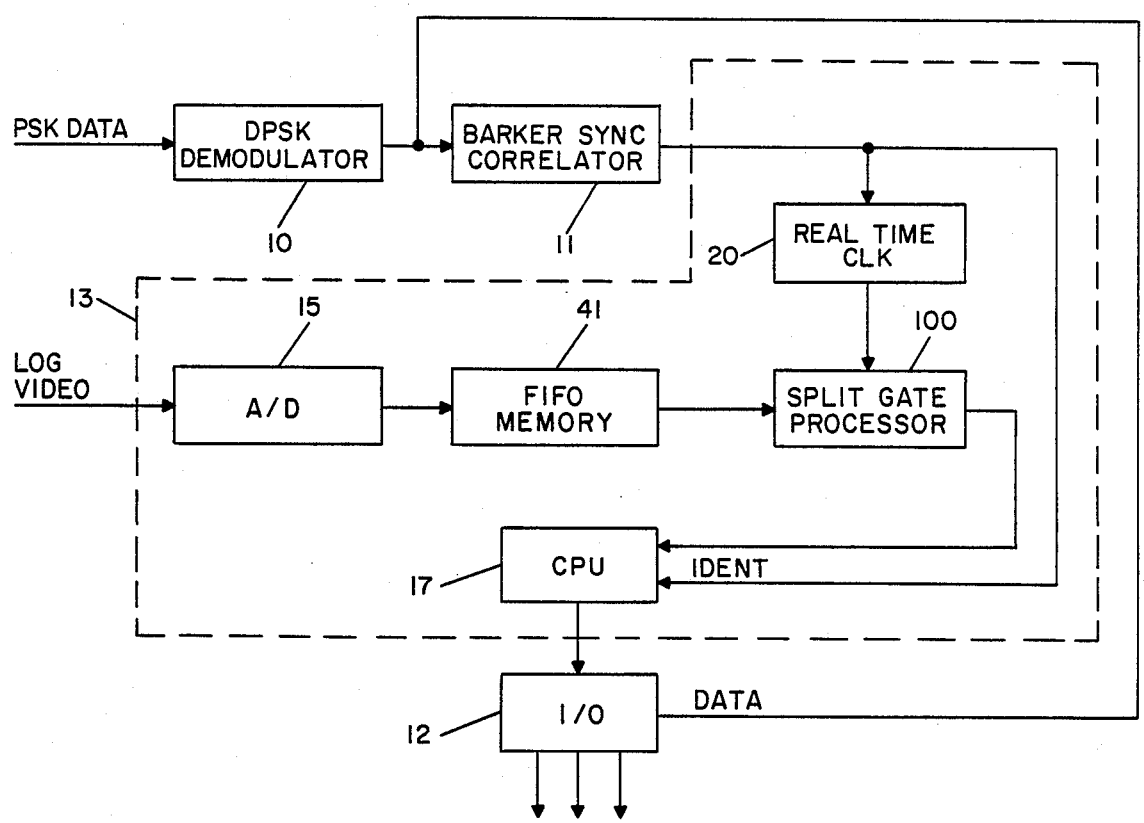
FIG. 2 is a block diagram illustrating a split gate signal processor as part of a digital processor of an MLS receiver as shown in FIG. 1.

FIG. 2 illustrates in block diagram form the portions of digital microprocessor 13 which are associated with split gate processor 100 according to the invention. Incoming data is demodulated by DPSK demodulator 10 and decoded by Barker syncronization correlator 11. The demodulated data from demodulator 10 is provided to input/output 12 and the correlated data from correlator 11 provides identification information to CPU 17 as well as clock information to real time clock 20. Log video information is converted to digital information by analog-to-digital converter 15 and is stored in first-in-first out (FIFO) memory 41 before processing by split gate processor 100.

Figure 4A:
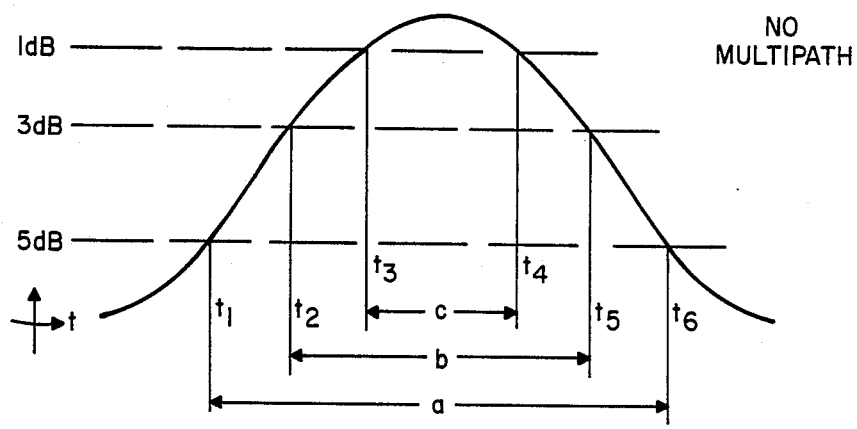
FIGS. 4a and 4b are graphs illustrating the operation of the multi level split gate preprocessor of FIG. 3.
Figure 4B:
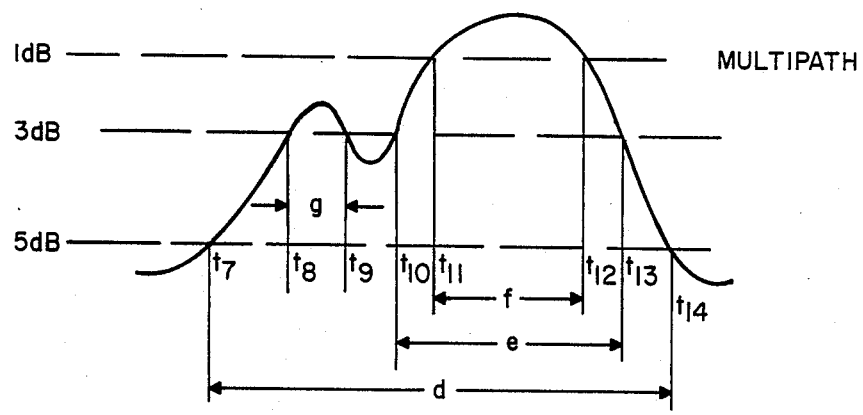

In a preferred environment in which multipath and other distortion effects are not present, it is possible to enable a counter when a received pulse-type signal rises above a predetermined value below the peak amplitude of the signal. The counter may then be stopped when the amplitude falls below the same level on the other side of the peak. The centroid is then found by determining from the counter the time between rise and fall and relating it to a reference time. This is known as dwell gate processing. A received signal which is not affected by multipath as illustrated in FIG. 4a may be analyzed in this way. However, when the shape of the received signal within a dwell gate is distorted by a multipath return, as illustrated in FIG. 4b, the apparent centroid is skewed from the true value.

In order to minimize error due to multipath, the invention analyzes the wave shape of the received signal. One way to accomplish this analysis is to establish a number of dwell gates at different levels below the peak of the received signal. In this manner, the centroid of the received signal is determined by observing the time intervals at representative levels of the signal. Generally, three levels are sufficient to define the centroid of the received signal effectively. This is known as a split gate processor.

Figure 3:
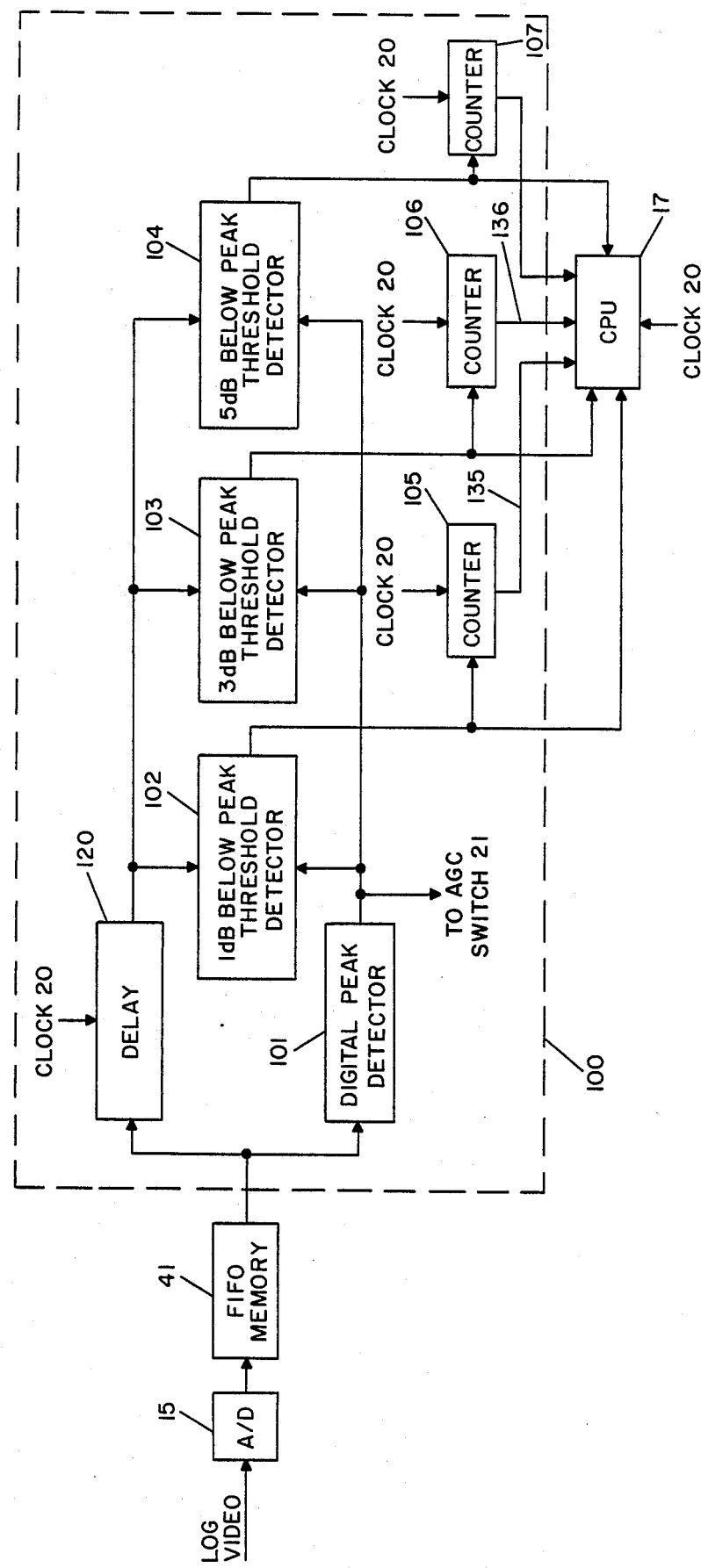
FIG. 3 is a block diagram of a multi level split gate signal processor according to the invention.

In order to fully understand the function of split gate processor 100 of the invention as illustrated in FIG. 3, it is necessary to describe the technique used in establishing the thresholds and determining the amplitude of the received pulse-type signal which results from the scanning MLS beam. The detected analog signal is obtained by processing the received signal through a linear-/logarithmic amplifier chain as illustrated in FIG. 1 so that the output amplitude is maintained within the limits of the logarithmic transfer function. With such a transfer function, an incremental difference in the input signal is represented by a fixed level at the output at any point within the dynamic range of the system.

As illustrated in FIG. 3, the received signal is digitized by the A/D converter 15 and the results are stored in FIFO memory 41. The peak of the received signal is determined by digital peak detector 101. The peak information is provided to AGC switch 21 for averaging and to one input of threshold detectors 102, 103 and 104. The digitized signal is delayed by delay 120 to compensate for the time it takes peak detector 101 to complete its detection cycle and provide the detected information to an input of threshold detectors 102, 103, and 104. The digitized, delayed signal is then provided to another input of threshold detectors 102, 103, 104 which repectively examine the delayed signal for points 5 db, 3 db, and 1 db below the peak by subtracting the respective numbers representing those relationships from the peak value. Since each measurement is being performed in real time, it is possible to determine when the 5 db point occurs on the rise of the pulse and when it occurs again on the decay. A counter is started when the first 5 db point occurs of the pulse and stopped when the second 5 db point occurs on the decay of the pulse.

In particular, threshold detector 102 detects amplitudes of the delayed, digitized signal which are 1 db below the peak detected by digital peak detector 101. When a signal amplitude of 1 db below the peak is detected, counter 105 is enabled and CPU 17 is signaled via control line 135 to store the time at which counter 105 was enabled. When the signal is again detected on the decay at 1 db below the peak, detector 102 disables counter 105. The total count from counter 105 indicates the time between the 1 db below peak levels. Referring to FIG. 4a, counter 105 would be enabled at time $t_3$ and disabled at time $t_4$ with CPU 17 storing time $t_3$ and counter 105 storing a count representing the total time c between $t_3$ and $t_4$. Referring to FIG. 4b illustrating the multipath case, counter 105 would be enabled at time $t_{11}$ and disabled at time $t_{12}$ with CPU 17 storing time $t_{11}$ and counter 105 storing a count representing the total time f between $t_{11}$ and $t_{12}$. Thereafter, CPU 17 performs the necessary calculations to derive the midpoint in time of the period detected at the 1 db below peak level. Similar counting and storing occurs with respect to counters 106 and 107 at the 3 db amd 5 db below peak levels. Eventually, CPU 17 averages the separate times represented by counters 105, 106, and 107 to determine the result of the information provided by all three counters and to determine the centroid of the received signal.

Threshold detector 103 detects amplitudes of the delayed, digitized signal which are 3 db below the peak detected by digital peak detector 101. When a signal amplitude of 3 db below the peak is detected, counter 106 is enabled and CPU 17 is signaled via control line 136 to store the time at which counter 106 was enabled. When the signal is again detected on the decay at 3 db below the peak, detector 103 disables counter 106. The total count from counter 106 indicates the time between the 3 db below peak levels. Referring to FIG. 4a, counter 106 would be enabled at time $t_2$ and disabled at time $t_5$ with CPU 17 storing time $t_2$ and counter 106 storing a count representing the total time b between $t_2$ and $t_5$. Referring to FIG. 4a illustrating the multipath case, counter 106 would be enabled at times $t_8$ and $t_{10}$ and disabled at times $t_9$ and $t_{13}$, respectively, with CPU 17 storing time $t_8$ and counter 106 storing a count representing the total time g between $t_8$ and $t_9$ and with CPU 17 storing time $t_{10}$ and counter 106 storing a count representing the total time e between $t_{10}$ and $t_{13}$. Thereafter, CPU 17 performs the necessary calculations to derive (for example by averaging) the midpoints in time of the periods detected at the 3 db below peak levels.

Preferably, CPU 17 is programmed with an algorithm which rejects the extra crossings observed at any level. The result of such rejection is that the total error due to multipath distortion is minimized by the averaging process.

In particular, CPU 17 may be programmed to reject crossing $t_8$ and $t_9$ in the 3 db below peak level. Based on such rejection, CPU 17 performs the necessary calculations to derive the midpoint in time of the unrejected period $t_{10}$-$t_{13}$ detected at the 3 db below peak level. Similarly, all levels below the detected level, i.e. the 5 db below peak level, would be adjusted by subtracting the period between the rejected crossings. Threshold detector 104 detects amplitudes of the delayed, digitized signal which are 5 db below the peak detected by digital peak detector 101. When a signal amplitude of 5 db below the peak is detected, counter 107 is enabled and CPU 17 is signaled via control line 137 to store the time at which counter 107 was enabled. When the signal is again detected on the decay at 5 db below the peak, detector 104 disables counter 107. The total count from counter 107 indicates the time between the 5 db below peak levels. Referring to FIG. 4a, counter 107 would be enabled at time $t_1$ and disabled at time $t_6$ with CPU 17 storing time $t_1$ and counter 107 storing a count representing the total time a between $t_1$ and $t_6$. Referring to FIG. 4b illustrating the multipath case, counter 107 would be enabled at time $t_7$ and disabled at time $t_{14}$ with CPU 17 storing the enabling time $t_7$. Thereafter, CPU 17 subtracts period g from the total count corresponding to total time d and performs the necessary calculations to derive the midpoint in time of the corrected period detected at the 5 db below peak level. Finally, CPU 17 averages the separate corrected times to determine the result of the information provided by all three counters to determine the centroid of the received signal.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. Apparatus for determining the centroid of a received pulse-type signal, said apparatus comprising:
   (a) means for detecting the received signal;
   (b) means for converting the detected signal into a corresponding digital signal;
   (c) peak detection means for detecting the peak amplitude represented by said digital signal and for developing an output signal representative thereof;
   (d) first threshold detection means, responsive to the output of said peak detection means, for determining the centroid of the digital signal with reference to a first predefined amplitude level below the peak level of the digital signal;
   (e) second threshold detection means, responsive to the output of said peak detection means, for determining the centroid of the digital signal with reference to a second predefined amplitude level below the peak of the digital signal;
   (f) means for averaging the centroids determined by said first and second threshold detection means whereby the averaged centroids represent the centroid of said received pulse-type signal.

2. The apparatus of claim 1 wherein each of said threshold detection means includes
   means for determining the time period during which said delayed digital signal is above the corresponding predefined amplitude level, for developing an output signal representative thereof and for supplying said output signal to said averaging means and wherein said means for averaging includes;
   means responsive to the first and second time period representative output signals from said corresponding first and second threshold detection means, respectively, for determining the midpoint of the average of the first and second time period whereby said midpoint corresponds to the centroid of said received signal.

3. The apparatus of claim 2 further comprising third threshold detection means for determining the centroid of the digital signal with reference to a third predefined amplitude level below the peak amplitude level of the digital signal, and wherein said means for averaging averages the centroids determined by the first second and third threshold detection means.

* * * * *